US012807850B2

(12) United States Patent
Sanders et al.

(10) Patent No.: US 12,807,850 B2
(45) Date of Patent: Nov. 24, 2026

(54) TWO-PART ADHESIVE PRODUCT FOR ADHESIVELY BONDING FOAMED SUBSTRATES

(71) Applicant: BASF SE, Ludwigshafen am Rhein (DE)

(72) Inventors: Gemma Sanders, Ludwigshafen am Rhein (DE); Juergen Siroky, Ludwigshafen am Rhein (DE); Ines Pietsch, Ludwigshafen am Rhein (DE); Annika Spies, Ludwigshafen am Rhein (DE); Stephan Moebius, Ludwigshafen am Rhein (DE); Matthias Gerst, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 241 days.

(21) Appl. No.: 18/039,984

(22) PCT Filed: Nov. 30, 2021

(86) PCT No.: PCT/EP2021/083599

§ 371 (c)(1),
(2) Date: Jun. 2, 2023

(87) PCT Pub. No.: WO2022/122479

PCT Pub. Date: Jun. 16, 2022

(65) Prior Publication Data

US 2024/0018398 A1 Jan. 18, 2024

(30) Foreign Application Priority Data

Dec. 7, 2020 (EP) .................................... 20212275

(51) Int. Cl.

*C09J 133/10* (2006.01)
*C09J 5/04* (2006.01)
*C09J 11/04* (2006.01)

(52) U.S. Cl.

CPC ............... *C09J 133/10* (2013.01); *C09J 5/04* (2013.01); *C09J 11/04* (2013.01)

(58) Field of Classification Search

CPC ... C09J 133/10; C09J 5/04; C09J 11/04; C09J 133/08; C08L 2201/52; C08F 220/1804;

(Continued)

(56) References Cited

U.S. PATENT DOCUMENTS

| | | | |
|---|---|---|---|
| 4,386,992 | A | 6/1983 | Takegawa et al. |
| 4,479,840 | A | 10/1984 | Takegawa et al. |
| 5,977,242 | A | 11/1999 | Origuchi et al. |

FOREIGN PATENT DOCUMENTS

| | | | | | |
|---|---|---|---|---|---|
| EP | 0470928 | A1 | | 2/1992 | |
| JP | S5763371 | A | * | 4/1982 | |
| WO | WO-2018098127 | A2 | * | 5/2018 | ............ C08F 220/56 |

OTHER PUBLICATIONS

JPS5763371 Google Translate Image Translation of each page of the document (Year: 2025).*

(Continued)

*Primary Examiner* — Sonya M Sengupta
(74) *Attorney, Agent, or Firm* — Faegre Drinker Biddle & Reath LLP

(57) ABSTRACT

A description is given of a two-part adhesive product comprising a first composition in the form of an aqueous polymer dispersion comprising at least one adhesive polymer which is formed by emulsion polymerization of soft (meth)acrylic ester monomers, monomers with an acid group, styrene, and optionally further monomers. A second composition comprises a metal salt coagulant which causes instantaneous coagulation of the first composition when (Continued)

contacting the first with the second composition. The two-part adhesive product can be used for adhesively bonding foamed substrates.

14 Claims, 1 Drawing Sheet

(58) Field of Classification Search
CPC .................. C08F 220/06; C08F 212/08; C08F 220/1811; C08F 220/14; C08F 220/36; C08K 2003/3081
See application file for complete search history.

(56) References Cited

OTHER PUBLICATIONS

JPS5763371 Machine Translation of Description from ESPACENET (Year: 2025).*
International Search Report and Written Opinion received for PCT Patent Application No. PCT/EP2021/083599, mailed on Mar. 4, 2022, 9 pages.

* cited by examiner

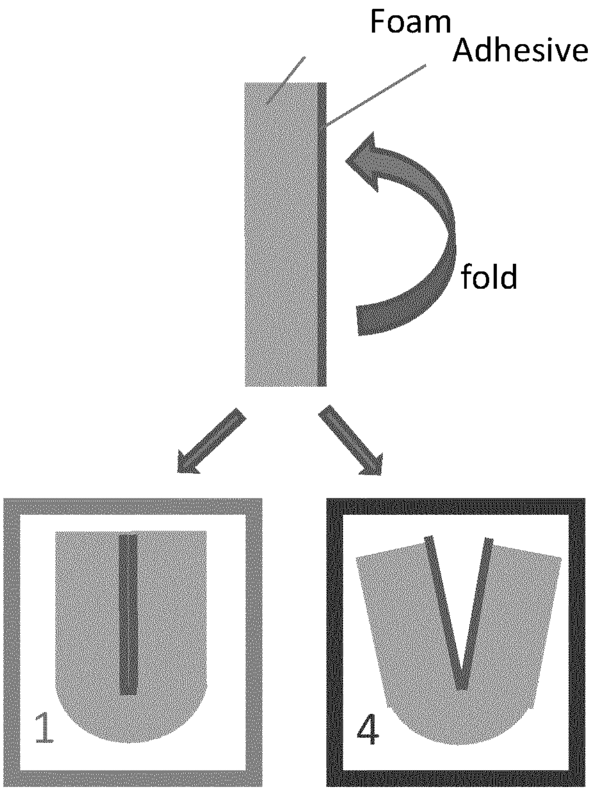
Foam
Adhesive
fold
1
4

TWO-PART ADHESIVE PRODUCT FOR ADHESIVELY BONDING FOAMED SUBSTRATES

CROSS-REFERENCE TO RELATED APPLICATIONS

This application is a National stage application (under 35 U.S.C. § 371) of PCT/EP2021/083599, filed Nov. 30, 2021, which claims benefit of European Application No. 20212275.0, filed Dec. 7, 2020, both of which are incorporated herein by reference in their entirety.

The invention relates to a two-part adhesive product comprising a first composition in the form of an aqueous polymer dispersion comprising at least one dispersed adhesive polymer which is formed by emulsion polymerization of soft (meth)acrylic ester monomers, monomers with an acid group, styrene, and optionally further monomers. A second composition comprises a metal salt coagulant which causes instantaneous coagulation of the first composition when contacting the first with the second composition. The two-part adhesive product can be used for adhesively bonding foamed substrates immediately.

Specific technical problems have to be overcome when adhesively bonding foamed substrates or substrates with absorbent surfaces, such as for example soft polyether foams, hard polyester foams or melamine foams, such as for example Basotect® foams. Industrial foams are typically bonded together in order to obtain more or less complex geometric forms of the volumes to be filled. They may be fixed on supports made from a different material, such as wood or plastics materials, for example, in the production of chairs, seats, sofas, mattresses etc. before being covered by textile or other cushion tops.

The adhesives currently used for the aforementioned purposes are generally mono-component or bi-component adhesives. In particular, polychloroprene-borne adhesive formulations have been known for a long time in this field, principally as a replacement for natural latex-borne adhesives. There are currently several approaches of commercial importance based on different technologies for so-called foam adhesives (adhesives for bonding foamed substrates). One technology uses organic solvent-based adhesives, wherein the adhesives are either styrene-butadiene-styrene copolymers, styrene-isoprene-styrene copolymers, or chloroprene rubber. Activation is achieved by evaporation of the organic solvent. In the specific case of solvent-based adhesives, the adhesive polymer is dissolved or dispersed in a volatile solvent, most commonly chlorinated solvents or solvents with a low flash point. Because of the presence of these volatile solvents, the drying time of the contact adhesive prior to assembly is relatively quick. However, over recent years, for reasons of safety, health or the environment, a growing demand has emerged for water-based, organic solvent-free products.

A solvent-free approach is the use of APAO-based hotmelt adhesives (amorphous poly-alpha-olefins). Activation is achieved by heating, requiring substantial amounts of energy for heating. The disadvantage of hotmelts is the risk of burns, the short application time after the adhesive is applied, the odor and the costly and elaborate application setup if it is to be applied by a hot melt spray nozzle system. Further approaches are the use of 1-component or 2-component water-based adhesives which are free of organic solvents. Water-based 1-component foam adhesives are typically polymer dispersions based on a combination of chloroprene rubber and acrylate polymers which are activated by coagulation through shear forces. Water-based 1-component foam adhesives are typically polymer dispersions based on a combination of chloroprene rubber and acids or salts or on polyurethanes and acids of salts. Polyurethanes have the disadvantage of being relatively cost intensive. Due to availability and environmental reason there is a market need for cost efficient, aqueous-based, non-polyurethane, chlorine-free alternatives to chloroprene rubber.

U.S. Pat. Nos. 4,479,840 and 4,386,992 describe 2-part adhesives comprising an aqueous synthetic resin emulsion adhesive and a gelling agent comprising specific organic metal salts. EP 0470928 A1 describes a method of bonding porous substrates with aqueous polymer dispersion adhesives. The polymer dispersion comprises a combination of rubber, acrylic copolymer and chloroprene polymer. As the chloroprene dispersions show a crystallization behavior which is well suited for foam adhesion and which crystallization behavior acrylic polymers often do not have, there is an existing desire for sprayable, chlorine-free alternatives to achieve a similar performance as chloroprene in foam adhesion applications.

It was an object of the present invention to provide aqueous (i.e. without organic solvents) spray adhesives for foam adhesion, free of chloroprene or other organic chlorine compounds, suitable for spray applications and with comparatively low production costs and a performance similar to chloroprene-containing adhesives.

It has been found that the problem could be solved by the 2-component spray adhesive as described herein. It has been found that an acrylic-styrene copolymer dispersion with specifically low gel content when combined during spraying with a metal solution acting simultaneously as coalescing agent and as crosslinker achieves foam adhesion performance comparable to chloroprene-based foam adhesives. The low gel content allows the interdiffusion of the polymer chains during application. With the metal salt solution the dispersion coagulates during the spraying application. At the same time, the multi-valent metal ions crosslink the polymer chains via the copolymerized acid groups and a high green strength and good heat resistance can be achieved.

A subject of the invention is a two-part adhesive product comprising a first composition and a second composition; wherein (A) the first composition is an adhesive composition in the form of an aqueous polymer dispersion comprising at least one dispersed adhesive polymer formed by emulsion polymerization of
  (i) at least 60 wt. %, based on the sum of the monomers, of at least one soft (meth)acrylic ester monomer which when polymerized as a homopolymer has a glass transition temperature of less than 0° C., preferably less than −20° C.,
  (ii) 0.1 to 15 wt. %, based on the sum of the monomers, of a monomer comprising at least one acid group,
  (iii) 0.1 to 30 wt. %, based on the sum of the monomers, of styrene,
  (iv) optionally further monomers, different from (i) to (iii), where the polymerization takes place in the presence of 0 to 1 part by weight of chain transfer agent per 100 parts by weight of monomers, where the adhesive polymer has a gel content of less than 35 wt. %, preferably from 0 to 30 wt. %, based, on a polymer film produced from the adhesive polymer dispersion without mixing with the second composition, and where the glass transition temperature of the adhesive polymer is less than 0° C., preferably −10° C. or less, measured by differential scanning calorimetry as the midpoint temperature according to ASTM D 3418-08, and where the $d_{50}$ particle size of the dispersed pressure-sensitive adhesive polymer is less than 300 nm, preferably from 50 to 270 nm; and wherein (B) the second composition comprises a metal salt coagulant in a form which causes instantaneous coagulation of the first composition when contacting the first with the second composition.

The wt. % details for the monomers are based in each case on the sum of all monomers used in the polymerization, unless indicated otherwise.

A two-part adhesive product is an adhesive comprising two compositions which are held separately until shortly before application to the substrate which is to be bonded.

Occasionally in the text below, the designation "(meth) acryl . . . " and similar designations are used as an abbreviated notation for "acryl . . . or methacryl . . . ". In the designation Cx alkyl(meth)acrylate and analogous designations, x denotes the number of carbon atoms in the alkyl group.

The viscosity of the first composition is measured using a cone/plate rotational viscometer according to DIN EN ISO 3219 at 23° C. and 250 1/s (e.g., rheometer "MCR 301" from Anton Paar, measurement build CP25-1-SN12203).

The glass transition temperature is determined by differential scanning calorimetry (ASTM D 3418-08, midpoint temperature). The glass transition temperature of the polymer in the polymer dispersion is the glass transition temperature obtained on evaluation of the second heating curve (heating rate 20 C/min).

The gel content is measured by producing a polymer film from a polymer dispersion and drying it for a day at room temperature (20° C.) and for 4 days at 50° C. The film is then admixed with 99 times the mass of methyl ethyl ketone and stored at room temperature for 4 days. It is filtered off on a tared 125 μm Perlon filter, and the filter is dried at room temperature until free from solvent and then dried further for an hour at 50° C. The gel fraction is the fraction insoluble in methyl ethyl ketone that is determined by re-weighing.

Soft monomers are monomers which when polymerized as a homopolymer have a glass transition temperature of less than 0° C., preferably less than −20° C.

The amount of soft (meth)acrylic ester monomer (i) is at least 60 wt. %, preferably at least 65 wt. %, e.g., from 65 to 99.5 wt. %, preferably from 70 to 94 wt. % or from 70 to 90 wt. %. Preferred soft monomers are n-butyl acrylate, 2-ethylhexyl acrylate, and ethyl acrylate and isobornyl acrylate. Particularly preferred are n-butyl acrylate, 2-ethylhexyl acrylate, and a mixture thereof. The adhesive polymer is preferably formed from 65 to 99.5 wt. %, based on the sum of the monomers, of at least one soft (meth)acrylic ester monomer selected from n-butyl acrylate and 2-ethylhexyl acrylate.

The amount of monomers comprising at least one acid group is 0.1 to 15 wt. %, based on the sum of the monomers, preferably 0.5 to 12 wt. %, or 1 to 10 wt. %, or 4 to 10 wt. %. Preferred acid group is carboxylic acid group. Monomers with at least one acid group are for example acrylic acid, methacrylic acid, and itaconic acid. As monomer (ii) it is also possible to use monomers which contain two acid groups that are able to react with metal cations, examples being 1,2-dicarboxylic acids such as, for example, maleic acid, fumaric acid, itaconic acid. Preferred monomers with acid groups are monomers with a single acid carboxylic acid group. A preferred acid monomer is methacrylic acid.

Styrene (iii) is used in an amount of 0.1 to 30 wt. %, based on the sum of the monomers, preferably from 5 to 25 wt. % or from 5 to 20 wt. %. If no chain transfer agent is used, the amount of styrene (iii) is preferably at least 5 wt. %.

Optionally, it is possible to use further monomers (iv), which are different from the monomers (i) to (iii). The further monomers (iv) are copolymerizable, ethylenically unsaturated compounds.

The optional monomers (iv) are used preferably in amounts of 0 to less than or equal to 15 wt. %, based on the sum of all monomers, or of 0.1 to 10 wt. %, or of 1 to 10 wt. %, or of 1 to less than or equal to 8 wt. %, based on the sum of the monomers. The monomers (iv) are preferably selected from the group consisting of C1 to C20 alkyl (meth) acrylates (different from monomers (i); i.e. which when polymerized as a homopolymer have a glass transition temperature of more than 0° C.), monomers comprising hydroxyl groups, vinyl esters of carboxylic acids comprising up to 20 carbon atoms, vinyl aromatics having up to 20 carbon atoms, ethylenically unsaturated nitriles, vinyl ethers of alcohols comprising 1 to 10 carbon atoms, aliphatic hydrocarbons having 2 to 8 carbon atoms and one or two double bonds, and (meth)acrylamides or mixtures of these monomers, different from the monomers (i) to (iii). Further monomers include phenyloxyethyl glycol mono(meth)acrylate, glycidyl(meth)acrylate, ureido-functional monomers, for example ureidoethyl methacrylate (UMA); diacetone acryl amide; and aminoalkyl(meth)acrylates such as 2-aminoethyl (meth)acrylate, for example.

Alkyl groups have preferably from 1 to 20 carbon atoms. $C_1$-$C_{20}$ alkyl(meth)acrylates have 1-20 carbon atoms in the alkyl groups. $C_1$-$C_{10}$ hydroxyalkyl(meth)acrylates have 1-10 carbon atoms in the hydroxyalkyl groups.

As monomer (iv) it is also possible to use monomers which contain functional groups that are able to react with metal cations, or monomers having complexing groups such as 2-(methacryloyloxy)ethyl acetoacetate, for example.

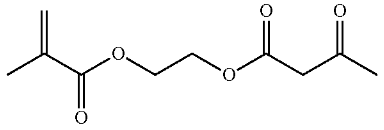

C1 to C20 alkyl(meth)acrylates are, for example, methyl acrylate and methyl methacrylate. Monomers comprising hydroxyl groups are, for example, $C_1$-$C_{10}$ hydroxyalkyl (meth)acrylates. Vinyl esters of carboxylic acids having 1 to 20 carbon atoms are, for example, vinyl acetate, vinyl laurate, vinyl stearate, vinyl propionate, and vinyl esters of Versatic acid. Vinylaromatic compounds contemplated include vinyltoluene, alpha- and p-methyl styrene, alpha-butyl styrene, 4-n-butyl styrene, 4-n-decyl styrene. Examples of nitriles are acrylonitrile and methacrylonitrile. Vinyl ethers include, for example, vinyl methyl ether or vinyl isobutyl ether. Preferred vinyl ethers are those of alcohols comprising 1 to 4 carbon atoms. Suitable hydrocarbons having 4 to 8 carbon atoms and two olefinic double bonds are, for example, butadiene and isoprene.

Preferred as further monomers (iv) are methyl acrylate, methyl methacrylate, vinyl esters, especially vinyl acetate, and mixtures thereof, and also C2 to C10 hydroxyalkyl (meth)acrylates. Especially preferred are methyl acrylate, methyl methacrylate, vinyl acetate, and hydroxypropyl acrylate, and also mixtures of these monomers. Most preferred is methyl methacrylate.

In the polymerization it is possible to use chain transfer agents (CTAs). Preferably no CTAs are used. If CTAs are used, the amounts involved are preferably at least 0.01 part by weight of CTA per 100 parts by weight of monomers, e.g., from 0.01 to 1 parts by weight, or from 0.01 to 0.75 parts by weight per 100 parts by weight of the monomers to be polymerized. By this means it is possible to control or reduce the molar mass of the emulsion polymer, through a chain termination reaction. The CTAs here are bonded onto the polymer, generally onto the chain end. They may be added continuously or in stages during the polymerization. Suitable CTAs are, for example, organic compounds which comprise sulfur in bound form (e.g., compounds having a thiol group), aliphatic and/or araliphatic halogen compounds, aliphatic and/or aromatic aldehydes, unsaturated fatty acids (such as oleic acid), dienes having nonconjugated double bonds (such as divinylmethane, terpinolene or vinyl cyclohexene), hydrocarbons having readily abstractable hydrogen atoms (such as toluene), organic acids and/or their salts (such as formic acid, sodium formate, ammonium formate), alcohols (such as isopropanol), and phosphorus compounds (such as sodium hypophosphite). It is, however, also possible to use mixtures of aforesaid CTAs that do not disrupt one another. Generally speaking, the CTAs are low molecular weight compounds, having a molar weight of less than 2000, more particularly less than 1000 g/mol. It is useful if a portion or the entirety of the CTAs is fed to the aqueous reaction medium before the radical polymerization is initiated. Furthermore, a portion or the entirety of the radical chain transfer compound can also be fed advantageously to the aqueous reaction medium together with the monomers during the polymerization.

Organic compounds having a thiol group are, for example, primary, secondary or tertiary aliphatic thiols, such as, for example, ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as 2-hydroxyethanethiol, for example, aromatic thiols, such as benzenethiol, ortho-, meta-, or para-methylbenzenethiol, mercaptoalkylcarboxylic esters of, for example, from C2 to C4 carboxylic acids having 1 to 18 carbon atoms in the alkyl group, e.g., 2-mercaptoethyl propionate, and also other sulfur compounds described in the Polymer Handbook, 3rd edition, 1989, J. Brandrup and E. H. Immergut, John Wiley & Sons, section II, pages 133 to 141. Preferred organic compounds comprising sulfur in bound form are, in particular, tert-butyl mercaptan, ethyl thioglycolate, mercaptoethanol, mercaptopropyl trimethoxysilane, tert-dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid, and thiourea. Particularly preferred thio compounds are tert-butyl mercaptan, ethyl thioglycolate, mercaptoethanol, mercaptopropyl trimethoxysilane or tert-dodecyl mercaptan. Aliphatic and/or araliphatic halogen compounds are, for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide. Aliphatic and/or aromatic aldehydes are, for example, formaldehyde, acetaldeyhde, propionaldehyde and/or benzaldehyde.

It has been found that the adhesive properties for 2-part spray adhesive application to foamed or porous substrates can be positively influenced by a specific, particularly low gel content of the polymer. The adhesive polymer has a gel content of less than 35 wt. %, preferably from 0 to 30 wt. % or from 1 to less than 30 wt. %, based, on a polymer film produced from the adhesive polymer dispersion without mixing with the second composition. A low gel content can be achieved for example by copolymerization with sufficient amount of styrene and/or by use of suitable chain transfer agents in small amounts, preferably by sufficient amount of styrene and without use of chain transfer agents.

The gel content after mixing with the metal salt coagulant is preferably at least 50 wt. %, more preferred at least 60 wt. %, for example from 60 to 70 wt. %, more preferred 60 to 65 wt. %.

The adhesive polymers of the invention are obtainable by radical polymerization of ethylenically unsaturated compounds (monomers). The polymers are prepared preferably by emulsion polymerization, and are therefore preferably emulsion polymers. In the emulsion polymerization, ethylenically unsaturated compounds (monomers) are polymerized in water, using ionic and/or nonionic emulsifiers and/or protective colloids, or stabilizers, as interface-active compounds for stabilizing the monomer droplets and the polymer particles formed subsequently from the monomers. The interface-active substances are used customarily in amounts of 0.1 to 10 parts by weight, preferably 0.2 to 5 parts by weight, based on 100 parts by weight of the monomers to be polymerized.

A comprehensive description of suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pp. 411 to 420. Emulsifiers contemplated include anionic, cationic, and nonionic emulsifiers. Interface-active substances used are preferably emulsifiers, whose molecular weights, in contrast to those of the protective colloids, are customarily below 2000 g/mol. Where mixtures of interface-active substances are used, the individual components must of course be compatible with one another, something which in case of doubt can be checked using a few preliminary tests. Interface-active substances used are preferably anionic and nonionic emulsifiers. Common accompanying emulsifiers are, for example, ethoxylated fatty alcohols (EO degree: 3 to 50, alkyl radical: $C_8$ to $C_{36}$), ethoxylated mono-, di-, and trial-kylphenols (EO degree: 3 to 50, alkyl radical: $C_4$ to $C_9$), alkali metal salts of dialkyl esters of sulfosuccinic acid, and also alkali metal salts and ammonium salts of alkyl sulfates (alkyl radical: $C_8$ to $C_{12}$), of ethoxylated alkanols (EO degree: 4 to 30, alkyl radical: $C_{12}$ to $C_{18}$), of ethoxylated alkylphenols (EO degree: 3 to 50, alkyl radical: $C_4$ to $C_9$), of alkylsulfonic acids (alkyl radical: $C_{12}$ to $C_{18}$), and of alkylarylsulfonic acids (alkyl radical: $C_9$ to $C_{18}$).

Further suitable emulsifiers are compounds of the general formula

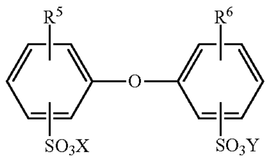

in which R5 and R6 are hydrogen or C4 to C14 alkyl and not simultaneously hydrogen, and X and Y may be alkali metal ions and/or ammonium ions. Preferably, R5 and R6 are linear or branched alkyl radicals having 6 to 18 carbon atoms or hydrogen, and in particular having 6, 12, and 16 carbon atoms, with R5 and R6 not both simultaneously being hydrogen. X and Y are preferably sodium, potassium, or ammonium ions, with sodium being particularly preferred. Particularly advantageous compounds are those in which X and Y are sodium, R5 is a branched alkyl radical having 12 carbon atoms, and R6 is hydrogen or R5. Use is frequently made of technical mixtures having a fraction of 50 to 90 wt. % of the monoalkylated product. Commercial products of suitable emulsifiers are, for example, Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. For the present invention, ionic emulsifiers or protective colloids are preferred. With particular preference they are ionic emulsifiers, more particularly salts and acids, such as carboxylic acids, sulfonic acids, and sulfates, sulfonates or carboxylates. In particular, use may also be made of mixtures of ionic and nonionic emulsifiers.

The emulsion polymerization may be started using water-soluble initiators. Water-soluble initiators are, for example, ammonium salts and alkali metal salts of peroxodisulfuric acid, sodium peroxodisulfate for example, hydrogen peroxide, or organic peroxides, tert-butyl hydroperoxide for example. Other suitable initiators include those called reduction-oxidation (redox) initiator systems. The redox initiator systems consist of at least one, usually inorganic, reducing agent and an organic or inorganic oxidizing agent. The oxidizing component comprises, for example, the initiators already stated above for the emulsion polymerization. The reducing components comprise, for example, alkali metal salts of sulfurous acid, such as sodium sulfite, sodium hydrogensulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems may be used along with soluble metal compounds whose metallic component is able to exist in a plurality of valence states. Examples of customary redox initiator systems include ascorbic acid/iron (II) sulfate/sodium peroxydisulfate, tert-butyl hydroperoxide/sodium disulfite, tert-butyl hydroperoxide/Na hydroxymethane sulfinic acid. The individual components, the reducing component for example, may also be mixtures, an example being a mixture of the sodium salt of hydroxymethane sulfinic acid and sodium disulfite.

The stated initiators are used usually in the form of aqueous solutions, with the lower concentration being determined by the amount of water that is acceptable in the dispersion, and the upper concentration by the solubility of the respective compound in water. Generally speaking, the concentration of the initiators is 0.1 to 30 wt. %, preferably 0.5 to 20 wt. %, more preferably 1.0 to 10 wt. %, based on the monomers to be polymerized. It is also possible for a plurality of different initiators to be used in the emulsion polymerization.

The emulsion polymerization takes place in general at 30 to 130° C., preferably at 50 to 95° C. The polymerization medium may consist either of water alone or else of mixtures of water and liquids miscible therewith such as methanol. Preference is given to using water alone. The emulsion polymerization may be carried out either as a batch operation or in the form of a feed process, including staged or gradient regimes. The feed process is preferred, in which a portion of the polymerization batch is introduced as an initial charge, and is heated to the polymerization temperature and its polymerization commenced, and then the remainder of the polymerization batch is supplied to the polymerization zone, customarily via a plurality of spatially separate feeds, of which one or more comprise the monomers in pure form or in emulsified form, this supply taking place continuously, in stages, or subject to a concentration gradient, with the polymerization being maintained. In the polymerization it is also possible for a polymer seed to be included in the initial charge, for the purpose of more effective setting of the particle size, for example.

The manner in which the initiator is added to the polymerization vessel in the course of the radical aqueous emulsion polymerization is known to a person of ordinary skill in the art. It may either be included in its entirety in the initial charge to the polymerization vessel, or introduced continuously or in stages at the rate at which it is consumed in the course of the radical aqueous emulsion polymerization. Individually, this is dependent on the chemical nature of the initiator system and also on the polymerization temperature. Preference is given to including part in the initial charge and supplying the remainder to the polymerization zone at the rate at which it is consumed. In order to remove the residual monomers, it is customary to add initiator after the end of the actual emulsion polymerization as well, i.e., after a monomer conversion of at least 95%. In the case of the feed process, the individual components may be added to the reactor from above, at the side, or from below, through the reactor bottom.

In the emulsion polymerization, aqueous dispersions of the polymer with solids contents generally of 5 to 75 wt. %, preferably of 15 to 60 wt. %, are obtained. For a high space/time yield of the reactor, dispersions with as high as possible a solids content are preferred. The polymer thus prepared is used preferably in the form of its aqueous dispersion. The particle size of the dispersed adhesive polymer is preferably less than 300 nm, more preferably from 50 to 270 nm. The size distribution of the dispersion particles may be monomodal, bimodal or multimodal, preferably monomodal. By particle size herein is meant the $d_{50}$ of the particle size distribution by weight, meaning that 50 wt. % of the total mass of all particles have a particle diameter smaller than the $d_{50}$. The particle size can be determined in a known way using an analytical ultracentrifuge (W. Mächtle, Makromolekulare Chemie 185 (1984), pp. 1025-1039).

The pH of the polymer dispersion is set preferably at a pH greater than 4.5, more particularly at a pH of between 5 and 8.

The viscosity of the first composition is preferably from 20 to 100 mPa s, measured according to DIN EN ISO 3219 at 23° C. and 250 1/s.

The second composition of the two-part spray adhesive comprises a metal salt coagulant in a form which causes instantaneous coagulation of the first composition when contacting the first with the second composition. The amount of the metal salt coagulant is preferably from 5 to 30 wt. %. The solvent of the second composition is preferably water. Suitable metal salts are salts with multi-valent metal cations, i.e. metal cations with a positive charge of two or more, for example, those with the metal cations $Al^{3+}$, $Zn^{2+}$, $Ti^{4+}$, $Ca^{2+}$, $Fe^{2+}$, $Fe^{3+}$ or $Zr^{4+}$. A form of the metal salt coagulant which causes instantaneous coagulation is a form having suitable counter-anions which are not complexing the metal cation in a way which would prevent instantaneous coagulation on contact with the polymer dispersion (such as complexing agents like acetylacetonate or oxalate would do). Preferred non-complexing anions are inorganic anions or non-complexing organic anions. Examples of suitable non-complexing counterions are for example sulfate or chloride. Preferred metal salt coagulants are aluminum sulfate, potassium aluminum sulfate, and calcium chloride.

The dynamic viscosity of the second composition is preferably 0.5 to 15 mPa s at 20° C.

A particularly preferred two-part adhesive product comprises in the first composition a dispersed adhesive polymer which is formed from (i) at least 65 wt. %, preferably 70 to 94 wt. %, more preferably 70 to 90 wt. %, based on the sum of the monomers, of at least one acrylic ester monomer selected from n-butyl acrylate and 2-ethylhexyl acrylate, (ii) 0.5 to 12 wt. %, preferably 1 to 10 wt. %, more preferably 4 to 10 wt. %, based on the sum of the monomers, of methacrylic acid or acrylic acid, (iii) 5 to 25 wt. %, more preferably 5 to 20 wt. %, based on the sum of the monomers, of styrene, (iv) 0.1 to 10 wt. %, preferably 1 to 10 wt. %, more preferably 1 to 8 wt. %, based on the sum of the monomers, of monomers which are different from the monomers (i) to (iii) and selected from the group consisting of C1 to C20 alkyl (meth)acrylates, monomers comprising hydroxyl groups, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, ureido-functional monomers, diacetone acryl amide;

where the adhesive polymer has a gel content of less than 35 wt. %, preferably from 0 to 30 wt. %, based, on a polymer film produced from the adhesive polymer dispersion, without mixing with the second composition; and the glass transition temperature of the polymer is less than −10° C.;

wherein the metal cation of the metal salt coagulant in the second composition is selected from $Al^{3+}$, $Zn^{2+}$, $Ti^{4+}$, $Ca^{2+}$, $Fe^{3+}$ and $Zr^{4+}$.

The first composition comprising preferably 5 to 60 wt. % of the dispersed adhesive polymer in aqueous solvent. The second composition comprising preferably from 5 to 30 wt. % of the metal salt coagulant in aqueous solvent. The concentration of the first and second compositions and the flow rate of the first and second compositions during spraying are such that the molar ratio of metal cations of the metal salt to acid groups of the adhesive polymer is preferably from 1 to 300 mol %, more preferably from 1 to 100 mol %, or from 1 to 50 mol % when contacting the first with the second composition during spraying.

The first and/or the second composition of the invention may consist solely of the polymer dispersion in water or of the metal salt coagulant solution in water, respectively. Additionally, however, the compositions may comprise further additives, examples being fillers, dyes, flow control agents, thickeners, preferably associative thickeners, defoamers, crosslinkers, plasticizers, pigments or wetting agents. For more effective wetting of surfaces, the compositions may comprise, in particular, wetting assistants (wetting agents), examples being fatty alcohol ethoxylates, alkylphenol ethoxylates, nonylphenol ethoxylates, polyoxyethylene/propylenes, or sodium dodecylsulfonates. The amount of additives is preferably 0.05 to 5 parts by weight, more particularly 0.1 to 3 parts by weight, per 100 parts by weight of polymer (solid).

The first composition preferably comprises at least one tackifier (tackifying resins) in an amount of preferably 5 to 100 parts by weight, more preferably 5 to 40 parts by weight, based on 100 parts by weight of polymer (solid/solid). A tackifier is a polymeric or oligomeric adjuvant for adhesive polymers or, generally, for elastomers, which increases their autoadhesion (tack, inherent stickiness, self-adhesion), meaning that they adhere firmly to surfaces after brief, gentle applied pressure. Tackifiers are, for example, natural resins, such as rosins, and their derivatives formed by disproportionnation or isomerization, polymerization, dimerization and/or hydrogenation, or terpene resins. They may be present in their salt form (with, for example, monovalent or polyvalent counterions (cations)) or, preferably, in their esterified form. Alcohols used for the esterification may be monohydric or polyhydric. Examples are methanol, ethanediol, diethylene glycol, triethylene glycol, 1,2,3-propanethiol, and pentaerythritol. Also used, furthermore, are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, alpha-methylstyrene, and vinyltoluene. Tackifiers are known, for example, from Adhesive Age, July 1987, pages 19-23 or Polym. Mater. Sci. Eng. 61 (1989), pages 588-592.

Also being used increasingly as tackifiers are polyacrylates which have a low molar weight. These polyacrylates preferably have a weight-average molecular weight $M_w$ below 50 000, more particularly below 30 000. The polyacrylates consist preferably to an extent of at least 60 wt. %, more particularly at least 80 wt. %, of $C_1$-$C_8$ alkyl (meth) acrylates. Suitable are, for example, the low molecular weight polymers and oligomers described in WO 2013/117428, having a weight-average molecular weight of less than 50 000 and a glass transition temperature of greater than or equal to −40° C. to less than or equal to 0° C., preferably of greater than or equal to −35° C. to less than or equal to 0° C., preparable by emulsion polymerization in the presence of at least one chain transfer agent and preparable from a monomer mixture comprising at least 40 wt. % of at least one C1 to C20 alkyl (meth)acrylate. Preferred tackifiers are natural or chemically modified rosins. Rosins consist predominantly of abietic acid or derivatives of abietic acid. The tackifiers can be added simply to the polymer dispersion. In this case the tackifiers themselves are preferably in the form of an aqueous dispersion.

The first composition preferably comprises 60-95 parts by weight adhesive polymer, 5-40 parts by weight of tackifier(s) and optionally 0-10 parts by weight of further constituents such as, for example, the aforementioned wetting agents, thickeners, defoamers, crosslinkers, etc.

The two-part adhesive product according to the invention preferably comprises a spraying device for simultaneously applying the first and the second compositions in the form of a spray to the substrates to be adhesively bonded. The polymer dispersion (first component) coagulates when contacting the second component during spraying and is thus activated for adhesively bonding the substrate it is sprayed onto. The spraying device preferably has a first and a second coaxial or substantially coaxial nozzle, the first nozzle being connected to a reservoir containing the first composition (adhesive component) and the second nozzle being connected to a reservoir containing the second composition (coagulating component).

The two-part adhesive product according to the invention can be used for bonding substrates wherein at least one or both of the substrates to be bonded is porous or foamed. The surfaces to be bonded are at least partly coated with the sprayed compositions.

The invention also relates to the use of a two-part adhesive product according to any of the preceding claims for adhesively bonding foamed substrates. Suitable foam substrates are polyurethane (PU) foams, polyethylene (PE) foams, polypropylene (PP) foams, polyvinyl chloride (PVC) foams, expanded polyurethane (EPU), expanded polystyrene (EPS), polyester foams, polyether foams, melamine foams, rubber foams, cold foam. Preferred foam substrates are for example polyester foams, polyether foams and melamine foam substrates like Basotect®, which is a BASF product.

The two-part adhesive product can be used for example in the production of mattresses (e.g. cold foam mattresses, rubber foam mattresses, adhesion of foam components of spring core mattresses) or in the production of upholstered furniture like seating furniture (e.g. in cars, air planes, private living rooms or office spaces).

The invention also relates to a method for adhesively bonding one or more substrates which method comprises simultaneously applying the first and the second compositions of the two-part adhesive product according to the invention by co-spraying in the form of a spray to at least a part of the surface of at least one of the substrates to be adhesively bonded, disposing the substrates one on the other, and then contact-pressing them together. Preferred foam substrates are those mentioned above.

The solids content of the first composition comprising the at least one dispersed adhesive polymer in the form of an aqueous polymer dispersion is preferably 5 to 60 wt. %, more preferably from 40 to 55 wt. %, of the dispersed adhesive polymer in aqueous solvent. The solids content of the second composition comprising the at least one metal salt coagulant is preferably from 5 to 30 wt. %, more preferably from 10 to 25 wt. %; and the volume mixing ratio of first composition to second composition is preferably from 2:1 to 15:1, more preferably from 3:1 to 12:1 or from 4:1 to 10:1.

The quantity of applied adhesive composition is preferably from 30 to 300 moist g/m$^2$ and more preferably from 50 to 200 moist g/m$^2$. An adhesive film is thus obtained on the coated surface or surfaces, allowing the parts to be joined to be brought into contact almost instantaneously. It is, however, desirable that one of the two surfaces possesses a certain porosity, in order to allow water to be eliminated from the adhesive joint. In industrial applications, the materials are joined quickly after coating of the adhesive film, often in less than a minute, but the tack range may easily be extended to 30 minutes if so desired.

The invention also relates to adhesively bonded products which can be obtained by the method described herein.

The aforementioned method and two-part adhesive product is preferably used for joining foams on various supports, such as foam/foam, foam/wood, foam/plastic, etc. in the mattress, seat, textile, furniture, etc. industry.

The two-part adhesive comprising the aqueous polymer dispersion and the metal salt coagulant composition is chlorine-free and shows the same performance like chloroprene-containing adhesives for adhesively bonding foamed substrates.

BRIEF DESCRIPTION OF FIGURE

FIG. 1 shows the principle of the test setup as described below in the examples. A foam test substrate is coated with an adhesive on one side and the coated side is folded unto itself. A rating number "1" denotes a substrate which remains completely closed at the edges. A rating number "4" denotes a substrate which completely opens.

EXAMPLES

Starting materials and abbreviations used are as follows:

EHA: 2-ethylhexyl acrylate

BA: n-butyl acrylate

MA methyl acrylate

MMA methyl methacrylate

S: styrene

AA: acrylic acid

MAA methacrylic acid

UMA ureidoethyl methacrylate

EHTG 2-ethylhexyl thioglycolate iBoA isobornyl acrylate

Particle size: $d_{50}$ of the particle size distribution, meaning that 50 wt. % of the total mass of all particles have a particle diameter smaller than the $d_{50}$. measured by analytical ultracentrifuge.

Performance Tests

Determination of Gel Content

Polymer films are produced from the polymer dispersion under investigation without addition of the metal salt coagulant. The polymer films are dried for 1 day at room temperature (20° C.) and then for 4 days at 50° C. The dried film is admixed with 99 times the mass of methyl ethyl ketone. The inserted film is stored at room temperature for 4 days. Then the swollen or dissolved film is filtered off over tared 125 μm Perlon filters. The filter is dried at room temperature until it is free of solvent. This is followed by further drying at 50° C. for an hour, and the gel fraction (solids fraction insoluble in methyl ethyl ketone and remaining in the filter) is determined by re-weighing.

Examples E1 to E8 and Comparative Examples C1 to C2

First composition of the two-part adhesive:

Aqueous polymer dispersions are used that are prepared by emulsion polymerization in water from the monomers listed in Table 1. The quantities are parts by weight.

Particle sizes ($d_{50}$): 120 nm to 370 nm
Comparative samples C1 to C2: gel content>35%
Inventive samples: gel content<35%
Solid content: about 48-50 wt. %

TABLE 1

| Emulsion polymers (amounts in parts by weight) | | | | | | | | | | |
|---|---|---|---|---|---|---|---|---|---|---|
| Example | EHA | BA | S | MA | MMA | MAA | AA | iBoA | UMA | Gel [%] |
| C1 | 52 | — | — | 46 | — | — | 2 | — | — | 73 |
| C2 | 52 | — | — | 20 | 26 | — | 2 | — | — | 52 |
| E1 | — | 78 | 10 | — | 5 | 5 | — | — | 2 | <35 |
| E2 [1)] | — | 78 | 10 | — | 5 | 5 | — | — | 2 | <35 |
| E3 | — | 78 | 10 | — | 9 | 5 | — | — | — | <35 |
| E4 | — | 78 | 10 | — | 6.5 | 7.5 | — | — | — | <35 |
| E5 [2)] | — | 78 | 10 | — | 4.5 | 7.5 | — | — | 2 | <35 |
| E6 [3)] | — | 78 | 10 | — | 6.5 | 7.5 | — | — | — | <35 |
| E7 | — | 78 | 10 | — | 4.5 | 7.5 | — | — | — | <35 |
| E8 | — | 78 | 5 | — | 4.5 | 7.5 | — | 5 | — | <35 |

[1)] contains co-polymerized diacetone acrylamide and adipic acid dihydrazide, gel content of the polymer <35% prior to crosslinking with adipic acid dihydrazide
[2)] 0.005 pphm EHTG (chain transfer agent)
[3)] 0.015 pphm EHTG (chain transfer agent)

Second Composition of the Two-Part Adhesive:

Solution of 20 wt. % of aluminum sulfate $Al_2(SO_4)_3$ in water.

$KAl(SO_4)_2$ may be used instead of aluminum sulfate with similar results.

Testing of Adhesive Properties

To test the adhesive properties, the polymer dispersion is sprayed on the foam substrate without any further formulation. The dispersion is mixed with the coagulant in the spray jet by using a two-component-spraying device. The foam substrates are coated by spraying with a coat weight of around 200 g/m$^2$ (wet) and dried at 23° C. for 0 to 20 Minutes before joining to evaluate the open time.

Spraying device: Different models of different companies could be used for the manual spraying test: Walther Spritz- und Lackiersysteme GmbH, type "MDG 1", Krautzberger GmbH type "HS-25 2K" or Walther Pilot type "Pilot 2K bonding".

The adhesive properties are determined by the following method: Polyether foam substrates (density 40 kg/m$^3$, size 100×50×30 mm) is coated with 150 to 200 g/m$^2$ of wet adhesive. The volume mixing ratio of polymer dispersion to coagulant solution is at least 3:1 (range of 3:1 to 10:1), depending on the applied pressure.

FIG. 1 shows the principle of the test setup. A foam substrate is coated with the adhesive on one side. The coated side is folded unto itself after the respective open time. The adhesive performance is rated according to the following scheme:

1: completely closed at the edges
2: partly opened at the edges in the range of 2-7 mm
3: partly opened at the edges in the range of 8-18 mm
4: completely opened (opening at the edges>18 mm)

The test results are summarized in Table 2.

TABLE 2

| Performance results with aluminum sulfate (20% solid content) as coagulant; 50% solids content of dispersions | | | | | | |
|---|---|---|---|---|---|---|
| Example | Gel [%] | Application weight [g/50 cm$^2$] | Mixing volume ratio (dispersion:coagulant) | Open time 0 min | Open time 1 min | Open time 5 min |
| C1 | 73 | 0.66 | 3:1 | 4 | 4 | 4 |
| C2 | 52 | 0.90 | 3:1 | 4 | 4 | 4 |
| E1 | <35 | 1.0 | 3:1 | 2 | 1 | 1 |
| E2 | <35 [1)] | 0.80 | 4:1 | 2 | 1 | 1 |
| E3 | <35 | 0.92 | 9:1 | 1 | 1 | 1 |
| E4 | <35 | 0.99 | 7:1 | 1 | 1 | 1 |
| E5 | <35 | 1.0 | 8:1 | 1 | 1 | 1 |
| E6 | <35 | 1.0 | 10:1 | 1 | 1 | 1 |
| E7 | <35 | 1.0 | 4:1 | 1 | 1 | 1 |
| E8 | <35 | 1.1 | 5:1 | 1 | 1 | 1 |

[1)] prior to crosslinking with adipic acid dihydrazide

The examples show that inventive examples with low gel content result in significantly better bonding of foamed substrates.

The invention claimed is:

1. A two-part adhesive product comprising a first composition and a second composition; wherein (A) the first composition is an adhesive composition in the form of an aqueous polymer dispersion comprising at least one dispersed adhesive polymer formed by emulsion polymerization of (i) at least 60 wt. %, based on the sum of the monomers, of at least one soft (meth)acrylic ester monomer which when polymerized as a homopolymer has a glass transition temperature of less than 0° C., and wherein the adhesive polymer is formed from 70 to 94 wt. %, based on the sum of the monomers, of the at least one soft (meth)acrylic ester monomer selected from n-butyl acrylate and 2-ethylhexyl acrylate, (ii) 0.5 to 12 wt. %, based on the sum of the monomers, of a monomer comprising at least one acid group, and wherein the monomer comprising at least one acid group is selected from methacrylic acid or acrylic acid;

(iii) 5 to 25 wt. %, based on the sum of the monomers, of styrene, (vi) 0.1 to 10 wt. %, based on the sum of the monomers, further monomers, different from (i) to (iii), and selected from the group consisting of C1 to C20 alkyl (meth) acrylates, monomers comprising hydroxyl groups, vinylaromatics having up to 20 carbon atoms, ethylenically unsaturated nitriles, vinyl halides, vinyl ethers of alcohols comprising 1 to 10 cardon atoms, aliphatic hydrocarbons having 2 to 8 carbon atoms and one or two double bonds, ureido-functional monomers, diacetone acryl amide;

where the polymerization takes place in the presence of 0 to 1 part by weight of chain transfer agent per 100 parts by weight of monomers, where the adhesive polymer has a gel content of less than 35 wt. %, based, on a polymer film produced from the adhesive polymer dispersion without mixing with the second composition, and where a glass transition temperature of the adhesive polymer is less than 0° C., measured by differential scanning calorimetry as the midpoint temperature according to ASTM D 3418-08, and where a $d_{50}$ particle size of the dispersed adhesive polymer is less than 300 nm;

and wherein (B) the second composition comprises a metal salt coagulant in a form which causes instantaneous coagulation of the first composition when contacting the first with the second composition.

2. The product according to claim 1, wherein the gel content after mixing with metal salt coagulant is at least 50 wt. %.

3. The product according to claim 1, wherein the polymerization takes place in the presence of 0.01 to 0.75 parts by weight of chain transfer agent per 100 parts by weight of monomers.

4. The product according to claim 1, wherein the monomers (iv) are selected from the group consisting of C1 to C20 alkyl (meth) acrylates.

5. The product according to claim 1, wherein the metal cation of the metal salt coagulant is selected from $Al^{3+}$, $Zn^{2+}$, $Ti^{4+}$, $Ca^{2+}$, $Fe^{3+}$ and $Zr^{4+}$.

6. The product according to claim 1 wherein the metal salt coagulant is selected from aluminum sulfate, potassium aluminum sulfate, and calcium chloride.

7. The product according to claim 1, wherein the adhesive composition comprises at least one tackifier in an amount of 5 to 40 parts by weight, based on 100 parts by weight of polymer.

8. The product according to claim 1, wherein the metal cation of the metal salt coagulant is selected from $Al^{3+}$, $Zn^{2+}$, $Ti^{4+}$, $Ca^{2+}$, $Fe^{3+}$ and $Zr^{4+}$, and where the glass transition temperature of the polymer is less than −10° C.

9. The two-part adhesive product according to claim 1, the first composition comprising 5 to 60 wt. % of the dispersed adhesive polymer in aqueous solvent and the second composition comprising from 5 to 30 wt. % of the metal salt coagulant in aqueous solvent.

10. A method comprising utilizing the two-part adhesive product according to claim 1 for adhesively bonding foamed substrates; or in the production of mattresses or upholstered furniture.

11. The method according to claim 10, wherein the foamed substrates are selected from polyurethane foams, polyethylene foams, polypropylene foams, polyvinyl chloride foams, expanded polyurethane, expanded polystyrene, polyester foams, polyether foams, melamine foams, rubber foams, cold foam.

12. A method for adhesively bonding one or more foamed substrates which comprises simultaneously applying the first and the second compositions of the two-part adhesive product according to claim 1 by co-spraying in the form of a spray to at least a part of the foamed surface of at least one of the foamed substrates to be adhesively bonded, disposing the substrates one on the other, and then contact-pressing them together.

13. The method according to claim 12, wherein the solids content of the first composition comprising the at least one adhesive polymer in the form of an aqueous polymer dispersion is 5 to 60 wt. % of the dispersed adhesive polymer in aqueous solvent; and the solids content of the second composition comprising the at least one metal salt coagulant is from 5 to 30 wt. %; and the volume mixing ratio of first composition to second composition is from 2:1 to 15:1.

14. An adhesively bonded product obtained by the method according to claim 12.

* * * * *